(12) United States Patent
Iyer et al.

(10) Patent No.: US 9,381,951 B2
(45) Date of Patent: Jul. 5, 2016

(54) ENERGY ABSORBER FOR A VEHICLE HOOD

(71) Applicant: GM GLOBAL TECHNOLOGY OPERATIONS LLC, Detroit, MI (US)

(72) Inventors: Vijay Shankar Iyer, Karnataka (IN); Vivekananda Kinila, Karnataka (IN)

(73) Assignee: GM Global Technology Operations LLC, Detroit, MI (US)

( * ) Notice: Subject to any disclaimer, the term of this patent is extended or adjusted under 35 U.S.C. 154(b) by 0 days.

(21) Appl. No.: 14/451,471

(22) Filed: Aug. 5, 2014

(65) Prior Publication Data
US 2016/0039473 A1   Feb. 11, 2016

(51) Int. Cl.
*B62D 25/12*   (2006.01)

(52) U.S. Cl.
CPC ........................................ *B62D 25/12* (2013.01)

(58) Field of Classification Search
CPC ................................. E05F 5/022; B62D 25/12
USPC .................... 296/187.09, 193.11; 180/69.2
See application file for complete search history.

(56) References Cited

U.S. PATENT DOCUMENTS

| 6,039,388 | A  | * | 3/2000 | Choi ............................. 296/207 |
| 7,575,273 | B2 | * | 8/2009 | Wallman et al. ......... 296/193.11 |
| 7,690,722 | B2 | * | 4/2010 | Boggess ...................... 296/207 |

\* cited by examiner

*Primary Examiner* — Glenn Dayoan
*Assistant Examiner* — Melissa A Black
(74) *Attorney, Agent, or Firm* — Quinn Law Group, PLLC

(57) ABSTRACT

A supplemental energy absorber is provided for a vehicle having a hood subjectable to an external force event and a body structure including a primary hood stop. The supplemental energy absorber includes a spring portion and a resilient portion. The spring portion is attachable to the body structure. The resilient portion is attached to the spring portion. The supplemental energy absorber is configured to cooperate with the hood and the primary hood stop to supplement energy absorption during the external force event.

20 Claims, 4 Drawing Sheets

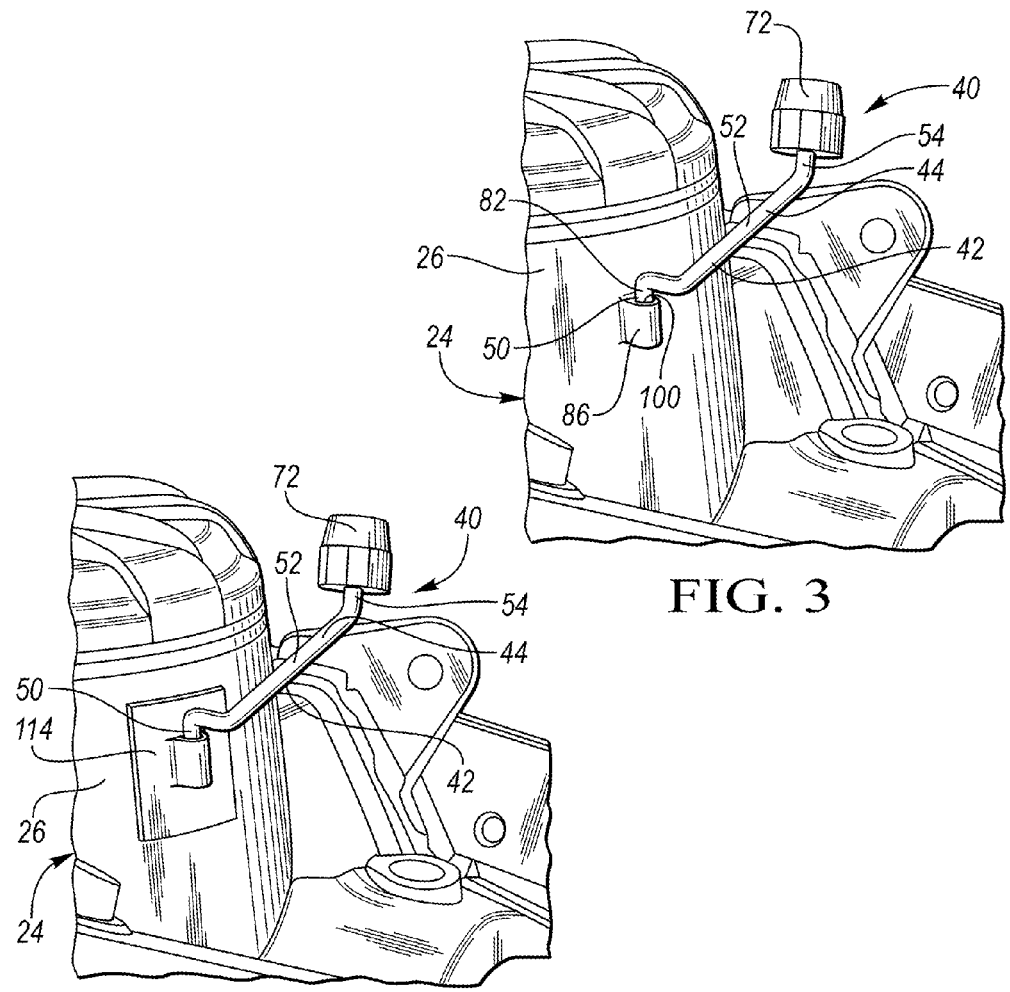
FIG. 3
FIG. 4
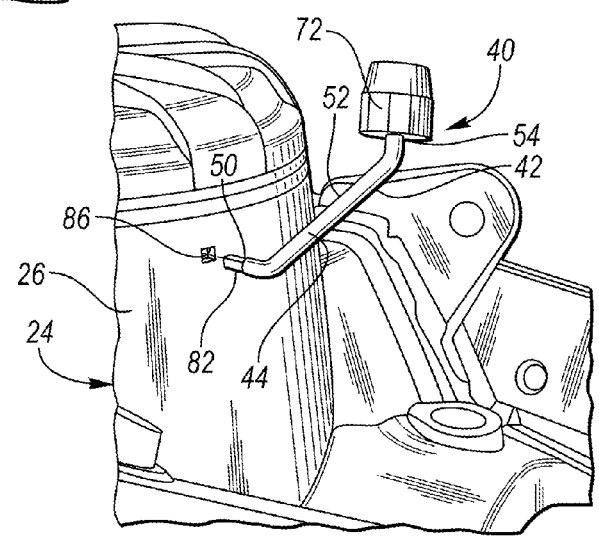
FIG. 5

ENERGY ABSORBER FOR A VEHICLE HOOD

TECHNICAL FIELD

This disclosure for a vehicle relates to an energy absorber for a vehicle hood that is subjectable to an external force event.

BACKGROUND

Vehicle hoods may be subjectable to an external force event. It may be beneficial to absorb energy during the external force event. It may be beneficial to achieve this without adding complex mechanisms and control systems to the vehicle.

SUMMARY

A supplemental energy absorber is provided for a vehicle having a hood subjectable to an external force event and a body structure including a primary hood stop. The supplemental energy absorber includes a spring portion and a resilient portion. The spring portion is attachable to the body structure. The resilient portion is attached to the spring portion. The supplemental energy absorber is configured to cooperate with the hood and the primary hood stop to supplement energy absorption during the external force event.

Another embodiment of the supplemental energy absorber includes a bracket, a spring portion, and a resilient portion. The bracket is attachable to the body structure. The spring portion is attached to the bracket. The resilient portion is attached to the spring portion. The supplemental energy absorber is configured to cooperate with the hood and the primary hood stop to supplement energy absorption during the external force event.

A vehicle having a hood subjectable to an external force event is also provided. The vehicle has a body structure including a primary hood stop and a supplemental energy absorber. The supplemental energy absorber includes a spring portion attached to the body structure and a resilient portion attached to the spring portion. The supplemental energy absorber is positioned to cooperate with the hood and the primary hood stop to supplement energy absorption during the external force event.

The provided supplemental energy absorber and vehicle may supplement energy absorption when the hood is subjected to an external force event. This may be achieved without adding complex mechanisms and control systems to the vehicle.

The above features and advantages and other features and advantages of the present teachings are readily apparent from the following detailed description of the best modes for carrying out the present teachings when taken in connection with the accompanying drawings.

BRIEF DESCRIPTION OF THE DRAWINGS

FIG. 3 is a schematic perspective illustration of another embodiment of the supplemental energy absorber which is attached to a sleeve formed in the body structure;

FIG. 4 is a schematic perspective illustration of another embodiment of the supplemental energy absorber which includes a bracket for attachment of the supplemental energy absorber to the body structure;

FIG. 5 is a schematic perspective illustration of another embodiment of the supplemental energy absorber which is pressed into a feature formed in the body structure;

DESCRIPTION

Figure 1:
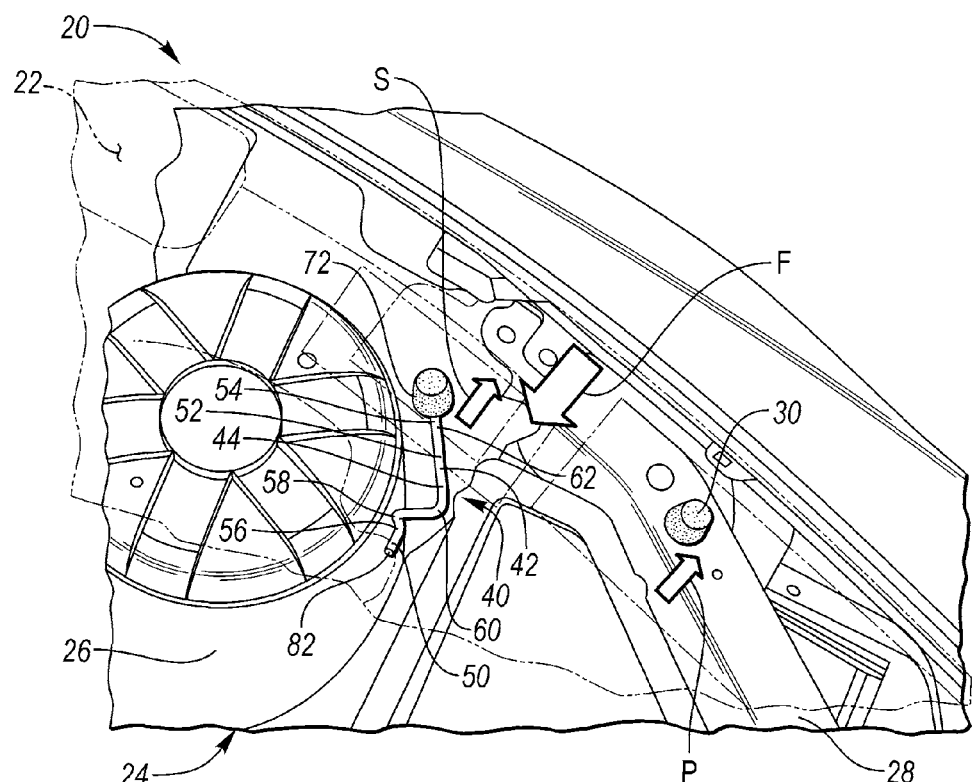
FIG. 1 is a fragmentary schematic perspective illustration of a vehicle having a hood, a body structure including a primary hood stop, and a supplemental energy absorber attached to the body structure and including a spring portion and a resilient portion.

Referring to the drawings, wherein like reference numbers refer to like components throughout the views, FIG. 1 shows a vehicle 20 having a hood 22 and a body structure 24. The hood 22 is subjectable to an external force F event. The body structure 24 includes a primary hood stop 30 and may include a shock tower 26 and a rail 28. The primary hood stop 30 may be attached to the rail 28 or to some other part of the body structure 24. The primary hood stop 30 may be made of a resilient material, such as rubber or plastic, or may be made of any other suitable material. The primary hood stop 30 may be in a solid frustoconical shape, as shown, a solid cylindrical shape, or in any other suitable shape. The primary hood stop 30 may stop the hood 22 from contacting the body structure 24 when the hood 22 is slammed shut. The primary hood stop 30 may come into contact with the hood 22 during the external force F event. The primary hood stop 30 may apply a primary hood stop force P to the hood 22 in reaction to the external force F and may deform to absorb energy during the external force F event.

Figure 2:
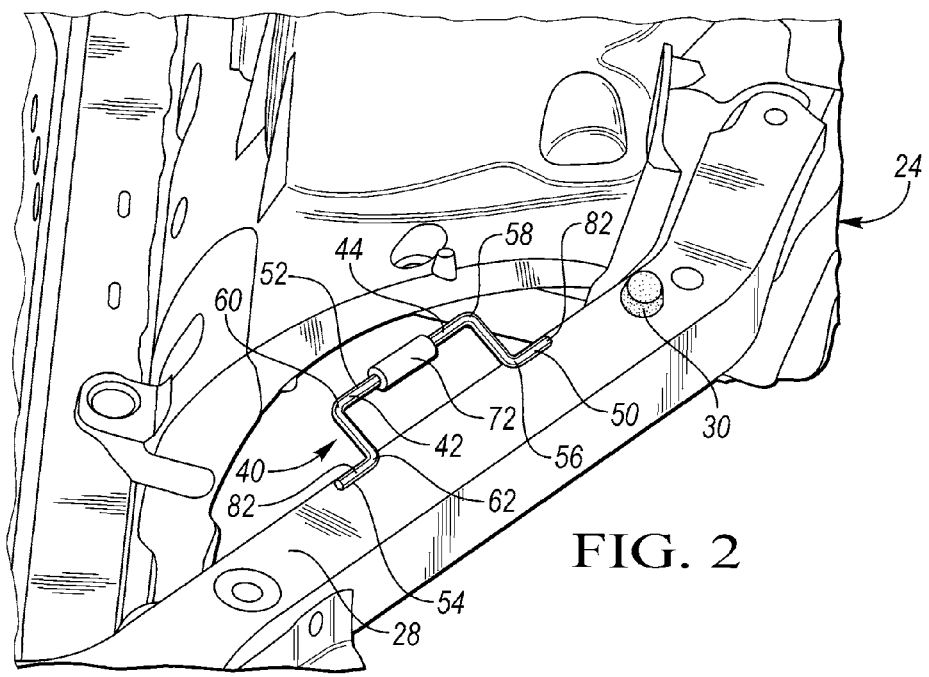
FIG. 2 is a schematic perspective illustration of another embodiment of the supplemental energy absorber which includes two attachments to the body structure.
Figure 7:
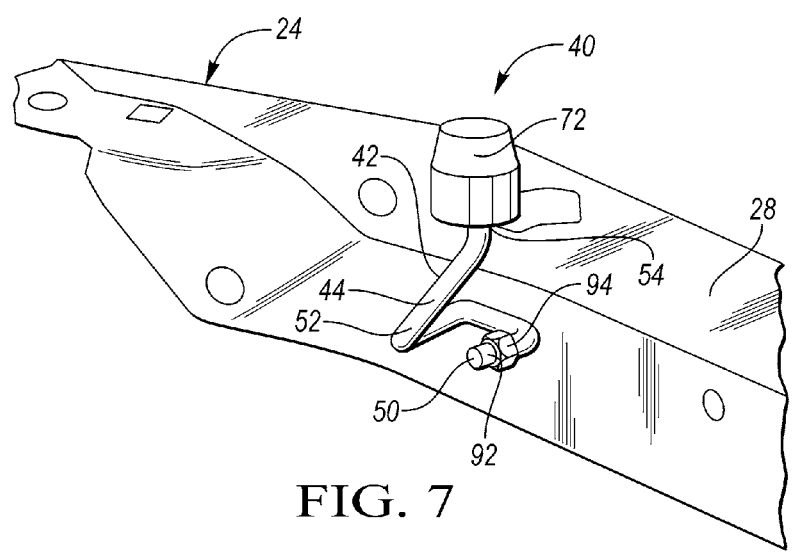
FIG. 7 is a schematic perspective illustration of another embodiment of the supplemental energy absorber which includes a threaded portion for attachment to the body structure.

The vehicle 20 has a supplemental energy absorber 40. The supplemental energy absorber 40 includes a spring portion 42 that may be attached to the body structure 24 and a resilient portion 72 attached to the spring portion 42. The spring portion 42 may include a rod or bar 44. The bar 44 may have a proximate portion 50, an intermediate portion 52, and a distal portion 54. The bar 44 may have a constant cross-section, perpendicular to its length, which may be a solid round shape, as shown, a solid polygon shape (as best seen in FIG. 2), or any other suitable shape. The proximate portion 50 of the bar 44 may be attached to the body structure 24, as shown. In some embodiments, the intermediate portion 52 may be attached to the body structure. In other embodiments, both the proximate portion 50 and the distal portion 54 may be attached to the body structure 24. The spring portion 42 may be attached to the body structure 24 via a weld, as shown, a fastener 94 (as best seen in FIG. 7), a bracket 114 (as best seen in FIG. 4), or by any other suitable attachment method.

The intermediate portion 52 of the bar 44 may include a first bend 56 having a first location and a first bend angle, a second bend 58 having a second bend location and a second bend angle, a third bend 60 having a third bend location and a third bend angle, and a fourth bend 62 having a fourth bend location and a fourth bend angle. Additional bends having respective bend locations and respective bend angles may be included. One or more of the bends 56, 58, 60, 62 may be for attaching the spring portion 42 to the body structure 24. One or more of the bends 56, 58, 60, 62 may be for establishing a geometry of the supplemental energy absorber 40 relative to the hood 22 and the body structure 24. One or more of the bends 56, 58, 60, 62 may be for establishing a deformation mode of the spring portion 42 and the resilient portion 72. One or more of the bends 56, 58, 60, 62 may be for establishing a deformation stiffness of the spring portion 42 and the resilient portion.

Figure 9:
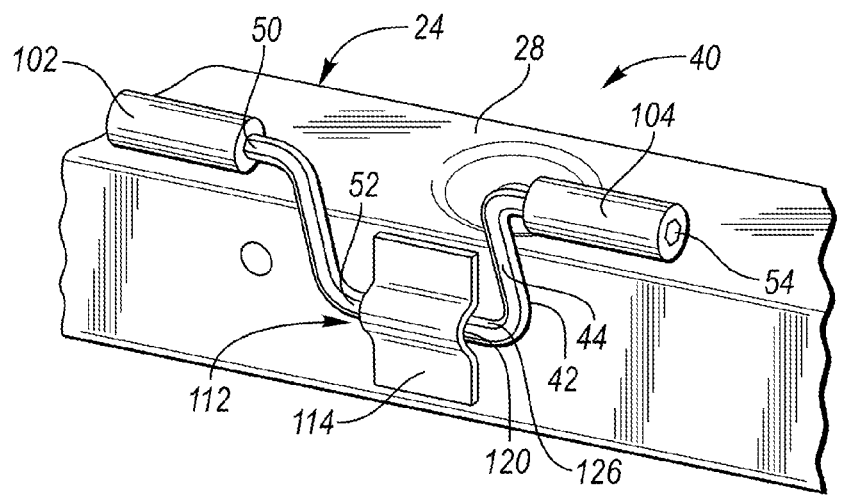
FIG. 9 is a schematic perspective illustration of another embodiment of the supplemental energy absorber which includes two resilient portions.

The resilient portion 72 may be made of a resilient material, such as rubber or plastic, or may be made of any other suitable material. The resilient portion 72 may be in a solid frustoconical shape, as shown, a solid cylindrical shape, a cylindrical sleeve shape (as best seen in FIG. 2), or in any other suitable shape. The resilient portion 72 may be attached to the spring portion 42. The resilient portion 72 may be attached to the spring portion 42 at the distal portion 54 of the rod or bar 44, as shown, or may be attached to the intermediate portion 52 of the bar 44 (as best seen in FIG. 2), or may be attached to both the proximate portion 50 and the distal portion 54 of the bar 44 (as best seen in FIG. 9). The resilient portion 72 may be attached to the spring portion 42 via a threaded engagement, an interference fit relationship, a fastener, or via any other suitable attachment method.

The supplemental energy absorber 40 is configured and positioned to cooperate with the hood 22 and the primary hood stop 30 to supplement energy absorption during the external force F event. During the external force F event, the hood 22 may come into contact with the primary hood stop 30 and the resilient portion 72 of the supplemental energy absorber 40. The primary hood stop 30 may apply a primary hood stop force P to the hood 22 in reaction to the external force F and may deform to absorb energy during the external force F event. The resilient portion 72 in cooperation with the spring portion 42 of the supplemental energy absorber 40 may apply a supplemental energy absorber force S to the hood 22. The resilient portion 72 and the spring portion 42 of the supplemental energy absorber 40 may deform to absorb energy in reaction to the external force F event. The hood 22 may deform to absorb energy during the external force F event.

The resilient portion 72 may have a resilient portion deformation mode, which may be one of elastic compression and elastic and plastic compression. The spring portion 42 deformation mode may be one or more of elastic torsion, elastic bending, elastic compression, elastic and plastic torsion, elastic and plastic bending, and elastic and plastic compression. One or more of the bend 56, 58, 60, 62 locations and bend 56, 58, 60, 62 angles may be adjusted to establish one or more deformation modes of the spring portion 42 and the resilient portion 72. One or more of the bend 56, 58, 60, 62 locations and bend 56, 58, 60, 62 angles may be adjusted to establish the deformation stiffness of the spring portion 42 and the resilient portion 72.

The spring portion 42 may be configured to absorb energy through elastic deformation. Alternatively, the spring portion 42 may be configured to absorb energy through both elastic and plastic deformation. The spring portion 42 bar 44 may be configured to absorb energy through deformation. The spring portion 42 bar 44 may be configured to absorb energy through torsional deformation.

Referring now to FIG. 2, in this embodiment, the proximate portion 50 and the distal portion 54 of the bar 44 is attached to the body structure 24 on the rail 28. The resilient portion 72 is a sleeve disposed around the intermediate portion 52 of the bar.

Referring now to FIG. 3, in this embodiment, the spring portion 42 includes an attachment feature 82 and the body structure 24 includes an attachment feature 86. The respective attachment features 82, 86 cooperate to facilitate attachment of the spring portion 42 to the body structure 24. The spring portion 42 attachment feature 82 may be the proximate portion 50 of the bar 44. The body structure attachment feature 86 may be a sleeve 100 formed in the body structure 24. The sleeve 100 may be formed in the body structure 24 by casting, forming, cutting, or by any other suitable process. In this embodiment, the spring portion 42 attachment feature 82 may be pressed into the body structure attachment feature 86. The respective attachment features 82, 86 may be in an interference fit relationship.

Referring now to FIG. 4, in this embodiment, the supplemental energy absorber 40 includes a bracket 114 attached to the spring portion 42 and to the body structure 24. The bracket may be attached to the spring portion 42 via an interference fit relationship, as shown, a weld, a fastener, or via any other suitable attachment. The bracket 114 may be attached to the body structure 24 via a weld, a fastener, or via any other suitable attachment.

Referring now to FIG. 5, in this embodiment, the spring portion 42 attachment feature 82 is a solid polygon shape formed on the proximate portion 50 of the bar 44. The body structure attachment feature 86 is a matching polygon shaped opening formed in the body structure 24. The spring portion 42 attachment feature 82 may be pressed into the body structure attachment feature 86. The respective features 82, 86 may be in an interference fit relationship.

Figure 6:
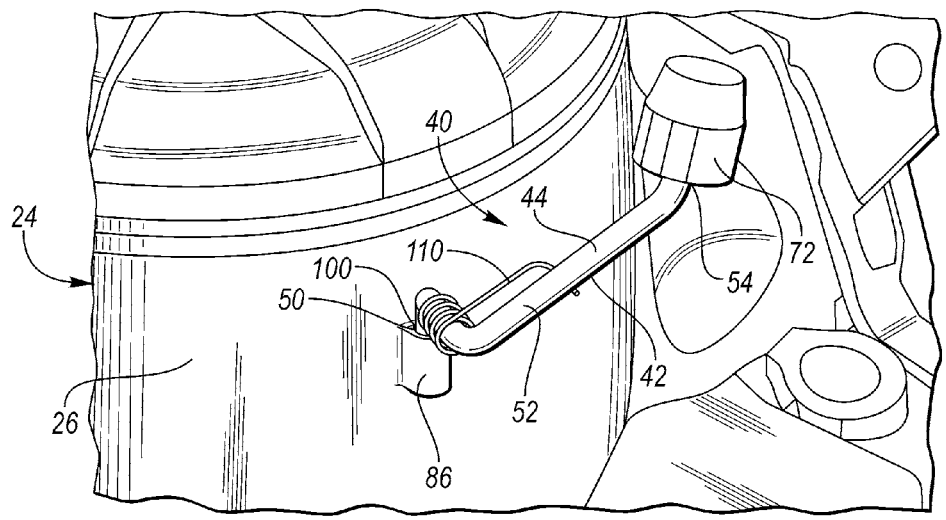
FIG. 6 is a schematic perspective illustration of another embodiment of the supplemental energy absorber which includes a helical coil spring.

Referring now to FIG. 6, in this embodiment, the spring portion 42 may further include a helical coil spring 110 configured to absorb energy during the external force F event. The helical coil spring 110 may be disposed around the intermediate portion 52 of the bar 44. The helical coil spring 110 may add to the deformation stiffness of the spring portion 42.

Referring now to FIG. 7, in this embodiment the proximate portion 50 of the bar 44 has threads 92. The threads 92 of the bar 44 may be engaged in threads of a nut 94 to attach the supplemental energy absorber 40 to the body structure 24. Alternatively, the threads 92 of the bar 44 may be engaged in threads (not shown) formed in the body structure 24. One or more of the bend 56, 58, 60, 62 locations and bend 56, 58, 60, 62 angles may facilitate the attachment of the supplemental energy absorber 40 to the body structure 24 when the threads 92 of the bar 44 are engaged by the threads of the nut 94.

Figure 8:
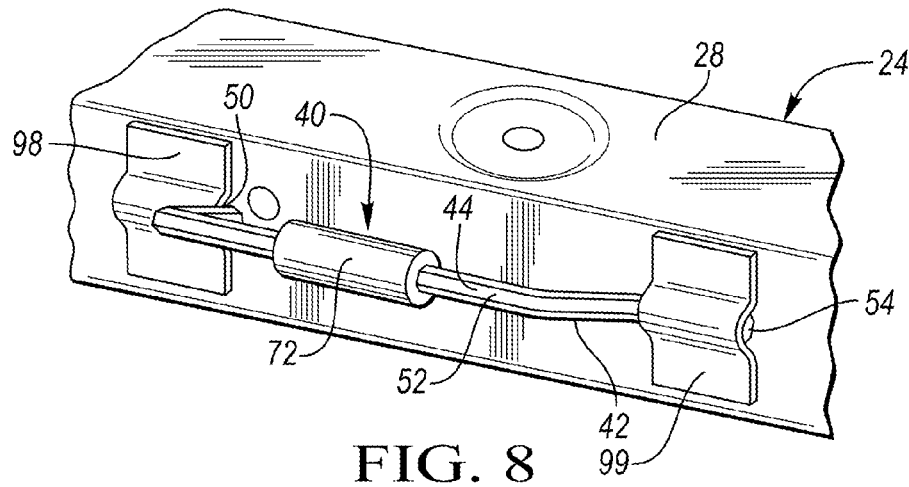
FIG. 8 is a schematic perspective illustration of another embodiment of the supplemental energy absorber which includes two brackets for attachment of the supplemental energy absorber to the body structure.

Referring now to FIG. 8, in this embodiment, the supplemental energy absorber 40 includes a first bracket 98 and a second bracket 99. The first bracket 98 is attached to the proximate portion 50 of the bar 44 and to the body structure 24 and the second bracket 99 is attached to the distal portion 54 of the bar 44 and to the body structure 24. The resilient portion 72 may be a sleeve disposed around the intermediate portion 52 of the bar 44.

Referring now to FIG. 9, in this embodiment, the supplemental energy absorber 40 includes a first resilient portion 102 and a second resilient portion 104. The bracket 114 is attached to the intermediate portion 52 of the bar 44 and to the body structure 24. The first resilient portion 102 may be a sleeve disposed around the proximate portion 50 of the bar 44. The second resilient portion 104 may be a sleeve disposed around the distal portion 54 of the bar 44.

Figure 10:
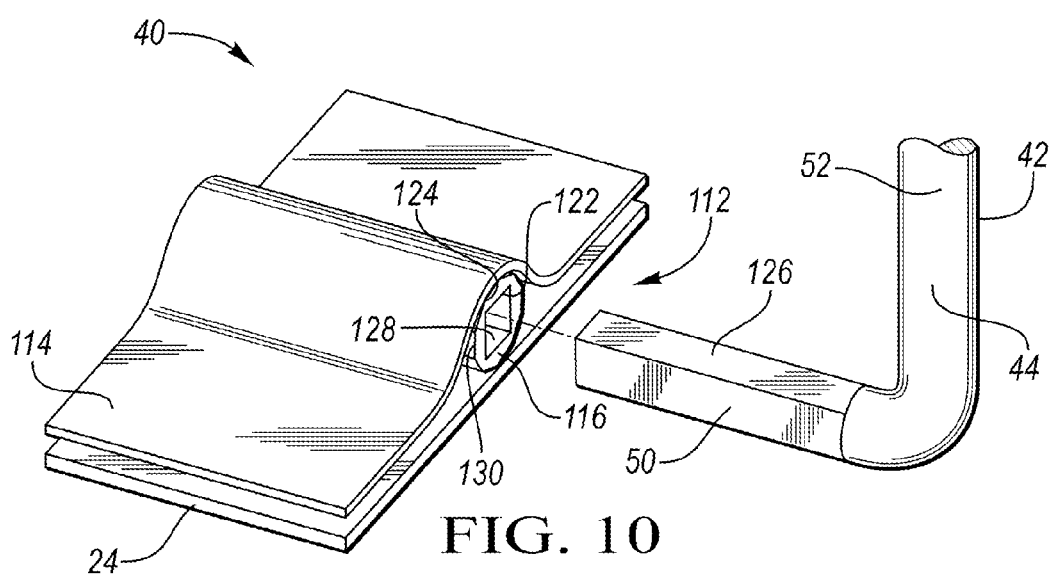
FIG. 10 is a schematic perspective illustration of another embodiment of the supplemental energy absorber which includes an energy damper.

Referring now to FIGS. 9-10, the supplemental energy absorber 40 may include a damper portion 112. The damper portion 112 may include a damper sleeve 116, as shown in FIG. 10. The damper portion 112 may be configured to absorb energy during the external force F event. An attachment interface 120, 122, 124 between the spring portion 42 and the bracket 114 may be configured to facilitate coulomb damping so that the attachment interface 120, 122, 124 absorbs energy during the external force F event. The attachment interface may be one of a spring portion to bracket interface 120, as shown seen in FIG. 9, a spring portion to damper sleeve interface 122, as shown in FIG. 10, and a damper sleeve to bracket interface 124, as shown in FIG. 10.

The spring portion 42 may include a spring portion damping feature 126, which may be a polygon shape, as shown in FIG. 10, a rough surface, or any other feature that facilitates coulomb damping. The damper sleeve 116 may include a first damper sleeve damping feature 128, which may be a polygon shape, as shown, a rough surface, or any other feature that facilitates coulomb damping. The damper sleeve 116 may include a second damper sleeve damping feature 130, which may be a polygon shape, as shown, a rough surface, or any other feature that facilitates coulomb damping. The bracket 114 may include a bracket damping feature (not shown), which may be a polygon shape, a rough surface, or any other feature that facilitates coulomb damping. Alternatively, the damping portion 112 may include other damping devices (not shown) such as rotational and telescoping hydraulic dampers, rotational and telescoping coulomb dampers, rotational and telescoping plastic deformation dampers, and any other suitable damping device.

While the best modes for carrying out the many aspects of the present teachings have been described in detail, those familiar with the art to which these teachings relate will recognize various alternative aspects for practicing the present teachings that are within the scope of the appended claims.

The invention claimed is:

1. A supplemental energy absorber for a vehicle having a hood subjectable to an external force event and a body structure including a primary hood stop, the supplemental energy absorber comprising:
a spring portion attachable to the body structure; and
a resilient portion attached to the spring portion;
wherein the supplemental energy absorber is configured to cooperate with the hood and the primary hood stop to supplement energy absorption during the external force event;
wherein the primary hood stop of the body structure is configured to apply a primary hood stop force to the hood during the external force event; and
wherein the supplemental energy absorber is configured to apply a supplemental energy absorber force to the hood during the external force event.

2. The supplemental energy absorber of claim 1, wherein the spring portion is configured to absorb energy through elastic deformation.

3. The supplemental energy absorber of claim 2, wherein the spring portion is configured to absorb energy through plastic deformation.

4. The supplemental energy absorber of claim 1, wherein the spring portion includes a bar configured to absorb energy through deformation.

5. The supplemental energy absorber of claim 4, wherein the bar is configured to absorb energy through torsional deformation.

6. The supplemental energy absorber of claim 4, wherein the spring portion further includes a helical coil spring configured to absorb energy during the external force event.

7. The supplemental energy absorber of claim 1, wherein the spring portion is attachable to the body structure via a weld.

8. The supplemental energy absorber of claim 1, wherein the spring portion includes an attachment feature and the body structure includes an attachment feature; and wherein the respective attachment features cooperate to facilitate attachment of the spring portion to the body structure.

9. The supplemental energy absorber of claim 8, wherein the respective attachment features are in an interference fit relationship.

10. The supplemental energy absorber of claim 1, further comprising a damper portion configured to absorb energy during the external force event.

11. A supplemental energy absorber for a vehicle having a hood subjectable to an external force event and a body structure having a primary hood stop, the supplemental energy absorber comprising:
a bracket attachable to the body structure;
a spring portion attached to the bracket; and
a resilient portion attached to the spring portion;
wherein the supplemental energy absorber is configured to cooperate with the hood and the primary hood stop to supplement energy absorption during the external force event;
wherein the primary hood stop of the body structure is configured to apply a primary hood stop force to the hood during the external force event; and
wherein the supplemental energy absorber is configured to apply a supplemental energy absorber force to the hood during the external force event.

12. The supplemental energy absorber of claim 11, wherein the spring portion is configured to absorb energy through elastic deformation.

13. The supplemental energy absorber of claim 12, wherein the spring portion is configured to absorb energy through plastic deformation.

14. The supplemental energy absorber of claim 11, wherein the spring portion includes a bar configured to absorb energy through deformation.

15. The supplemental energy absorber of claim 14, wherein the bar is configured to absorb energy through torsional deformation.

16. The supplemental energy absorber of claim 14, wherein the spring portion further includes a helical coil spring configured to absorb energy during the external force event.

17. The supplemental energy absorber of claim 11, wherein the bracket is attachable to the body structure via a fastener.

18. The supplemental energy absorber of claim 17, wherein the fastener is a weld.

19. The supplemental energy absorber of claim 11, further comprising an attachment interface between the spring portion and the bracket; wherein the attachment interface is configured to facilitate coulomb damping so that the attachment interface absorbs energy during the external force event.

20. A vehicle having a hood subjectable to an external force event, comprising:
a body structure including a primary hood stop; and
a supplemental energy absorber including:
a spring portion attached to the body structure; and
a resilient portion attached to the spring portion;

wherein the supplemental energy absorber is positioned to cooperate with the hood and the primary hood stop to supplement energy absorption during the external force event;

wherein the primary hood stop of the body structure is configured to apply a primary hood stop force to the hood during the external force event and wherein the supplemental energy absorber is configured to apply a supplemental energy absorber force to the hood during the external force event.

* * * * *